United States Patent Office 3,290,387
Patented Dec. 6, 1966

3,290,387
OXYALKYLATED DIMETHYLOL AND
TRIMETHYLOL ALKANES
Claude Bernardy, Geneva, Switzerland, and Marcel Prillieux and Robert Muths, Mont-Saint-Aignan, France, assignors to Esso Research and Engineering Company, a corporation of Delaware
No Drawing. Filed May 7, 1962, Ser. No. 193,011
Claims priority, application France, May 8, 1961, 861,174
6 Claims. (Cl. 260—615)

The present invention concerns novel industrial products, namely oxyalkylate dimethylol and trimethylol alkanes, which are distinguished by important surface active properties.

The products which are the objects of the present invention may be represented by the general formula:

$$\begin{array}{c} R_1 \quad CH_2-O-(AO)_n-H \\ \diagdown \diagup \\ C \\ \diagup \diagdown \\ R_2 \quad CH_2-O-(AO)_p-H \end{array}$$

in which $R_1$ represents a straight or branched aliphatic hydrocarbon chain having preferably 3 to 20, or better still, 9 to 12 carbon atoms, or hydrogen.

$R_2$ represents a straight or branched aliphatic hydrocarbon chain having preferably 3 to 20, or better still 9 to 12 carbon atoms or a group $-CH_2-O-(AO)_q-H$ A represents an alkaline chain having preferably 2 to 6 carbon atoms, $n$, $p$ and $q$ represent whole numbers preferably between 1 and 10, which may be the same or different.

The products of the present invention are water soluble products with good detergent and wetting properties. They have the further advantage of being biodegradable.

The products of the invention, which are oxyalkylated derivatives of dimethylol alkanes and/or trimethylol alkanes may be prepared by fixing an alkylene oxide onto the triol or diol or a mixture of the two. This may be effected in the presence of an acid or alkaline catalyst preferably at temperatures between about 60° C. and about 220° C. The number of molecules of alkylene oxide fixed on the diol or triol is so chosen that the required properties of solubility are obtained.

The trimethylol alkanes may be obtained by the reaction of one molecule of alkanol with three molecules of formaldehyde. Synthesis is effected in a single reaction comprising two stages:

(a) Condensation into dihydroxyaldehyde in the presence of an alkaline agent such as sodium carbonate, lime etc. acting as catalyst:

$$R-CH_2-CHO + HCHO \underset{OH^-}{\rightleftarrows} R-\underset{\underset{CH_2OH}{|}}{CH}-CHO$$

$$R-\underset{\underset{CH_2OH}{|}}{CH}-CHO + HCHO \underset{OH^-}{\rightleftarrows} R-\underset{\underset{CH_2OH}{|}}{\overset{\overset{CH_2OH}{|}}{C}}-CHO$$

(b) Cannizzaro's reaction between the hydroxyaldehyde and a third molecule of formaldehyde $$R-\underset{\underset{CH_2OH}{|}}{\overset{\overset{CH_2OH}{|}}{C}}-CHO + HCHO + HO^- \longrightarrow HCOO^- + R-\underset{\underset{CH_2OH}{|}}{\overset{\overset{CH_2OH}{|}}{C}}-CH_2OH$$

These reactions may be carried out by any method known in the art.

It will also be seen that reaction (b) can also take place on the first stage product of reaction (a) which is $$R-\underset{\underset{CH_2OH}{|}}{CH}-CHO$$

to give a product of formula $$R-\underset{\underset{CH_2OH}{|}}{\overset{\overset{CH_2OH}{|}}{CH}}$$

In the case of long chain aldehydes, the Cannizzaro reaction may be completed by hydrogenation with or without catalyst under pressures up to 100 kg./cm.² This eliminates any remaining aldehyde functions and correspondingly improves the hydroxyl index of the trimethylol alkane.

In particular it has been found that when one starts from long chain aldehydes (number of carbon atoms greater than 7), the above reactions tend to produce a mixture of trimethylol and dimethylol alkanes, the oxylkyl derivatives of which mixture have good detergent properties.

The following examples illustrate more clearly the nature of the invention.

EXAMPLE I

Ethoxylated trimethylol alkanes and ethoxylated mixtures of di- and trimethylol alkanes were prepared from various straight chain aldehydes: heptanal, dodecanal and pentadecanal; and operation was carried out as follows:

The aldehyde dissolved in isopropanol was introduced at 40° C. into a flask containing soda and formaldehyde in solution in isopropanol in the following proportions:

|  | Heptanal | Dodecanal | Pentadecanal |
|---|---|---|---|
| Isopropanol, ccs | 500 | 800 | 300 |
| Formaldehyde, gs. (36%) | 320 | 320 | 80 |
| Aldehyde, gs | 114 | 184 | 60 |
| 40% soda, gs | 120 | 120 | 30 |

The temperature was raised to 55–60° C. and the medium was kept alkaline for 6 hours by the addition of soda.

After neutralization with $H_2SO_4$, the reaction mixture was filtered hot. A considerable quantity of white precipitate was obtained. The filtrate was separated into two phases, the triol formed being contained in the isopropanol phase and all the water-soluble by-products being in the aqueous layer.

The products obtained by distillation in vacuo of the organic phase had a pasty consistency. They had the following characteristics, for the three aldehyde starting materials:

|  | OH index (mg. KOH/g.) | | Aldehyde function/kg. |
|---|---|---|---|
|  | Obtained | Theoretical |  |
| $C_5H_{11}C(CH_2OH)_3$ | 840 | 954 | 0 |
| $C_{10}H_{21}C(CH_2OH)_3$ | 296 | 682 | 1.8 |
| $C_{13}H_{27}C(CH_2OH)_3$ | 190 | 556 | 1.2 |

In the case of the dodecanal, the remaining aldehyde functions were reduced by hydrogenation at 50 kg./cm.² and 25° C. in the presence of a nickel catalyst. The hydroxyl index rose to 446.

These hydroxyl indices show that whereas in the case of the heptanal the product obtained was practically pure trimethylol alkane, the product obtained from dodecanal was a mixture of trimethylol alkane, $C_{10}H_{21}C(CH_2OH)_3$, and dimethylol alkane, $C_{10}H_{21}CH(CH_2OH)_2$, by far the greater proportion probably consisting of the latter.

The triol and the mixture of triol and diol were ethoxylated by fixing 6 to 12 molecules ethylene oxide per molecule of trimethylolalkane at 130° C. in the presence of soda. The detergent properties of these compounds were determined by measuring:

(a) their wetting power expressed by the concentration in grams/liter of the product dissolved in water required to produce a wetting time of 100 seconds for a sample of cotton fabric immersed in this solution.

(b) the lowering of surface tension as a function of the concentration of the product dissolved in water and, in particular, the value of the minimum tension which can be obtained and the concentration in grams/liter necessary to obtain this value.

The following table gives the results obtained:

TABLE I
*Ethoxylated triethylolalkane: Surface tension*

| Trimethylolalkane | Number of Molecules of Ethylene Oxide | Value in dynes/cm. | Concentration Required to Obtain this Value (g./l.) | Wetting Power-Concentration (g./l.) |
|---|---|---|---|---|
| Trimethylolhexane | 6 | 32 | 1.0 | 3.5 |
| Tri and Dimethylol Undecane | 6 | 32 | 0.5 | 3.0 |
| Do | 12 | 35 | 1.0 | 5 |
| Hydrogenated Tri and Dimethylol Undecane | 6 | 28 | 0.4 | 1.5 |
| Do | 12 | 29 | 0.4 | 3.0 |
| Tri and Dimethylol tetradecane | 6 | 34 | 2-3 | 6.0 |

This table shows that the best results from the point of view of surface active properties are obtained with the mixture of hydrogenated tri and dimethylolundecane to which 6 molecules of ethylene oxide have been fixed.

EXAMPLE II

The same reaction in an isopropanol medium was used for preparing a mixture of di and trimethylol alkanes starting from $C_9$, $C_{10}$ and $C_{13}$ aldehydes produced by the oxo process.

The mixture of diol and triol obtained had the following properties for each of the aldehyde starting materials:

| | OH index (mg. of KOH/g.) | | Aldehyde function/kg. |
|---|---|---|---|
| | Obtained | Theoretical | |
| Di and trimethylol octane | 516 | 831 | 1.3 |
| Di and trimethylol nonane | 575 | 771 | 0.6 |
| Di and trimethyloldodecane | 282 | 646 | 1.8 |

To eliminate the remaining aldehyde functions, the mixtures of trimethylol octane with dimethyloloctane, and di and trimethylol dodecane were hydrogenated at 20° C. for four hours under a pressure of 50 kg./cm.$^2$ in the presence of a Ni catalyst. The hydroxyl indices obtained were respectively 575 (831 theoretical) and 365 (646 theoretical).

The crude and hydrogenated mixtures were ethoxylated by affixing 6, 12 and 24 molecules of ethylene oxide per molecule of methylol compound at 150° C. in the presence of soda.

The ethoxylated dimethylol alkanes and tirmethylol alkanes with 6 and 12 molecules ethylene oxide are liquid whereas those ethoxylated with 24 molecules crystallize. All these products are soluble in water, although some solutions are turbid in the case of non-hydrogenated triols.

As in Example I, the wetting power, minimum surface tension and concentration in g./l. required to obtain this value were determined.

The following table shows the results obtained:

TABLE II
*Ethoxylated trimethylolalkane*

| Trimethylolalkane | Number of Molecules of Ethylene Oxide | Value in Dynes/cm. | Concentration Required to Obtain this Value (g./l.) | Wetting Power-Concentration (g./l.) |
|---|---|---|---|---|
| Di and Trimethylol Octane | 6 | 29 | 0.4 | 3.7 |
| Do | 12 | 29 | 0.5 | 6.4 |
| Do | 24 | 29 | 0.5 | 8.5 |
| Hydrogenated Di and Trimethylol Octane | 6 | 28 | 0.5 | 1.0 |
| | 12 | 29 | 0.5 | 3.3 |
| | 24 | 30 | 1.0 | 6.9 |
| Di and Trimethylolnonane | 6 | 28 | 0.4 | 1.1 |
| Di and Trimethyloldodecane | 6 | 31 | 2.0 | 5.5 |
| Hydrogenated Di and Trimethyloldodecane | 6 | 30 | 1.0 | 4.7 |

The same method was used in Example I; the reagents were used in the following proportions:

| | $C_9$ Oxo Aldehyde | $C_{10}$ Oxo Aldehyde | $C_{13}$ Oxo Aldehyde |
|---|---|---|---|
| Isopropanol, ccs | 1,000 | 400 | 600 |
| Formaldehyde, 36% gs | 1,000 | 300 | 300 |
| Aldehyde, gs | 568 | 156 | 175 |
| 40% Soda, gs | 350 | 120 | 120 |
| Duration of reaction in hours | 6 | 6 | 6 |

EXAMPLE III

The biodegradability of the mixture of oxyethylated dimethylol octane and trimethylol octane with 6 molecules of ethylene oxide from Example II was determined in the following manner:

A detergent solution at a concentration of 50 parts per million and containing at the same time a standard bacterial nutrient (maltopeptone) was circulated at a speed determined by means of a pump through a granite column on which bacteria had been grown.

The percentage of detergent not destroyed by amount of complex formed with barium phosphomolybdate is measured for different contact times.

The following experimental results were obtained:

| Duration of Contact | Percent of Detergent not Destroyed | |
|---|---|---|
| | 1st Test | 2d Test |
| 5½ hours | 57.5 | 57.7 |
| 24 hours | 8.08 | 17.08 |

The above description of the invention has been given only by way of example and is in no way limiting. It is obvious that it may be modified without departing from the scope of the invention.

What is claimed is:

1. The product formed by condensing a $C_9$ to $C_{15}$ alkanal with formaldehyde in the presence of an alkaline agent to form a mixture of dimethylol and trimethylol alkanes, said mixture being further reacted with a $C_2$ to $C_6$ alkylene oxide at a temperature from about 60° to 220° C., said product comprising a mixture of oxyalkylated dimethylol and trimethylol alkanes having the formulae:

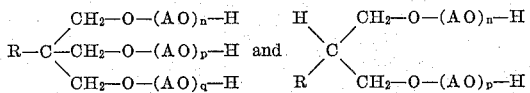

wherein R is selected from the group consisting of $C_9$ to $C_{12}$ straight chain and branched chain alkanes, A is a $C_2$ to $C_6$ alkylene chain and $n$, $p$ and $q$ represent whole numbers between 1 and 10.

2. The product as claimed in claim 1 wherein the mixture of dimethylol and trimethylol alkanes is hydrogenated prior to being reacted with the alkylene oxide to reduce residual aldehyde function.

3. The product as claimed in claim 1 wherein said aldehyde is a $C_9$ aldehyde and said alkylene oxide is ethylene oxide.

4. The product as claimed in claim 1 wherein said alhehyde is a $C_{10}$ aldehyde and said alkylene oxide is ethylene oxide.

5. The product as claimed in claim 1 wherein said aldehyde is a $C_{13}$ aldehyde and said alkylene oxide is ethylene oxide.

6. The product as claimed in claim 1 wherein the mole ratio of formaldehyde to $C_9$ to $C_{15}$ aldehyde is 3, and the ratio of the moles of alkylene oxide to the moles of dimethylol and trimethylol alkanes is from 6 to 24.

References Cited by the Examiner

UNITED STATES PATENTS 2,400,724  5/1946  Walker _____ 260—635
2,706,207  4/1955  Schnell et al. _____ 260—615

FOREIGN PATENTS 861,961  3/1961  Great Britain.

LEON ZITVER, *Primary Examiner.*

B. HELFIN, H. T. MARS, *Assistant Examiners.*